United States Patent
Zhang et al.

(10) Patent No.: US 11,894,153 B2
(45) Date of Patent: Feb. 6, 2024

(54) NARROW SLIT CHANNEL VISUALIZATION EXPERIMENTAL DEVICE AND METHOD UNDER SIX-DEGREE-OF-FREEDOM MOTION CONDITION

(71) Applicant: Xi'an Jiaotong University, Shaanxi (CN)

(72) Inventors: Kui Zhang, Shaanxi (CN); Zhixian Lai, Shaanxi (CN); Mingjun Wang, Shaanxi (CN); Chong Chen, Shaanxi (CN); Zhiming Zhu, Shaanxi (CN); Jing Zhang, Shaanxi (CN); Wenxi Tian, Shaanxi (CN); Suizheng Qiu, Shaanxi (CN); Guanghui Su, Shaanxi (CN)

(73) Assignee: Xi'an Jiaotong University, Xi'an (CN)

( * ) Notice: Subject to any disclaimer, the term of this patent is extended or adjusted under 35 U.S.C. 154(b) by 463 days.

(21) Appl. No.: 17/225,467

(22) Filed: Apr. 8, 2021

(65) Prior Publication Data

US 2022/0223305 A1     Jul. 14, 2022

(30) Foreign Application Priority Data

Jan. 11, 2021  (CN) .......................... 202110029253.1

(51) Int. Cl.
| | |
|---|---|
| *G21C 17/032* | (2006.01) |
| *H04N 13/239* | (2018.01) |
| *G01K 1/14* | (2021.01) |
| *G01K 7/02* | (2021.01) |
| *G21C 17/038* | (2006.01) |
| *H04N 23/66* | (2023.01) |
| *H04N 23/695* | (2023.01) |

(52) U.S. Cl.
CPC ............ *G21C 17/032* (2013.01); *G01K 1/14* (2013.01); *G01K 7/02* (2013.01); *G21C 17/038* (2013.01); *H04N 13/239* (2018.05); *H04N 23/66* (2023.01); *H04N 23/695* (2023.01)

(58) Field of Classification Search
CPC ............................ G21C 17/032; H04N 13/239
USPC .......................................................... 702/182
See application file for complete search history.

(56) References Cited

U.S. PATENT DOCUMENTS

| | | | |
|---|---|---|---|
| 10,921,585 B2* | 2/2021 | Büttner ................. | G02B 26/06 |
| 2005/0018882 A1* | 1/2005 | Muste .................... | G01F 1/002 |
| | | | 382/107 |
| 2016/0140730 A1* | 5/2016 | Falahatpisheh ...... | A61B 8/0883 |
| | | | 382/128 |

* cited by examiner

*Primary Examiner* — Ricky Go
(74) *Attorney, Agent, or Firm* — Greenberg Traurig, LLP; Peigan Jiang; David J. Dykeman

(57) ABSTRACT

The present disclosure relates to a narrow slit channel visualization experimental device and method under a six-degree-of-freedom motion condition. The system comprises a six-degree-of-freedom motion simulation platform, a main circulation loop, a cooling water system, an electric heating system and a bubble monitoring system, wherein the main circulation loop is composed of an S-shaped preheater, a three-surface visualization experimental section, a double-pipe condenser, a pressurizing circulating pump, a voltage stabilizer and related equipment, wherein the cooling water system is composed of the double-pipe condenser, a plate heat exchanger, a cooling tower, a cooling fan, a cooling water tank and related equipment, wherein the electric heating system is composed of a direct-current power supply, a low-voltage power controller and a transformer, and wherein the bubble monitoring system is composed of two high-speed cameras, a PIV measuring system and an electric servo module.

10 Claims, 3 Drawing Sheets

NARROW SLIT CHANNEL VISUALIZATION EXPERIMENTAL DEVICE AND METHOD UNDER SIX-DEGREE-OF-FREEDOM MOTION CONDITION

CROSS-REFERENCE TO RELATED APPLICATIONS

This application claims priority to Chinese Application Number 202110029253.1 filed on Jan. 11, 2021 and entitled "Narrow Slit Channel Visualization Experimental Device And Method Under Six-Degree-Of-Freedom Motion Condition," and is herein incorporated by reference in its entirety.

FIELD OF TECHNOLOGY

The present disclosure belongs to the technical field of nuclear power equipment performance verification experimental research under a motion condition, and particularly relates to a narrow slit channel visualization experimental device and method under a six-degree-of-freedom motion condition.

BACKGROUND OF TECHNOLOGY

Ships and nuclear power platforms on the sea are influenced by stormy waves, and ship bodies can generate six-degree-of-freedom motions such as inclination, swinging and translation and coupling motions of the six-degree-of-freedom motions. Marine motion conditions can bring additional inertia force to a reactor coolant system, so that the flow and heat transfer characteristics of a coolant in a loop become more complex.

An offshore nuclear power system is often limited by space, and aiming at the problems that a natural circulating system is large in size, large in material consumption and small in driving force, attention is paid to the fact that a rectangular channel or even a narrow rectangular channel is adopted in the natural circulating system increasingly in engineering so as to reduce the size of the natural circulating system and improve the driving force of the system. Due to the fact that more heating surfaces can be arranged in the limited space through the narrow rectangular channel, the requirements for miniaturization, high power and high performance of a heat exchange device in specific environments can be met. The heat exchange area of a narrow slit channel is large, boiling is generated more easily, bubbles are formed and circularly flow in the loop, large flow resistance is brought, and meanwhile, the flow and heat transfer characteristics of the coolant in the loop are further changed. Therefore, it is very necessary and important to carry out experimental research on the dynamic characteristics of narrow slit channel bubbles under an ocean motion condition.

In a narrow slit channel visualization bubble dynamic experiment under a six-degree-of-freedom motion condition, bubble formation and separation processes, a two-phase flow pattern and local flow field information of a circulation loop of which a heating section is a narrow slit channel under the ocean motion condition are mainly researched. Therefore, high requirements are required for the six-degree-of-freedom motion simulation ability, the multi-circulation flow mode simulation ability, the bubble three-dimensional monitoring ability and the error control level of an experimental device, and typical ocean conditions such as inclination, swing, diving, accelerated translation, vibration and coupling motion need to be simulated; narrow slit channel bubble dynamic experiments under natural circulation and forced circulation flow modes can be carried out; bubbles in the narrow slit channel can be monitored from different angles at the same time, and three-dimensional imaging can be carried out; and the errors of measuring instruments caused by the six-degree-of-freedom motion condition can be avoided.

In CN106248673A which is a bubble dynamic visualization research device suitable for dynamic motion conditions, researches on supercooled boiling bubble behaviors under natural circulation and forced circulation conditions are carried out, a single-surface visualization narrow slit channel is adopted in the research, only wide-surface bubble behaviors are researched, the bubble dynamic phenomenon can be analyzed only from a two-dimensional angle, and the phenomena of bubble generation, separation and the like are difficult to research.

SUMMARY OF DESCRIBED SUBJECT MATTER

The present disclosure aims to provide a narrow slit channel visualization experimental device and method under a six-degree-of-freedom motion condition in order to solve the problem that an experimental device or an experimental system is not suitable for or does not meet the requirement of nuclear power equipment performance verification experimental research under the motion condition in a nuclear engineering field. According to the experimental device, six-degree-of-freedom motion and coupling motion simulation can be achieved, meanwhile, three surfaces of an experimental section are provided with visual windows, three-dimensional imaging of bubbles can be achieved, and natural circulation bubble dynamic characteristic research under the six-degree-of-freedom motion condition can be carried out.

In order to achieve the above purpose, the present disclosure adopts the following technical scheme:

a narrow slit channel visualization experimental device under a six-degree-of-freedom motion condition comprises a six-degree-of-freedom motion simulation platform, a main circulation loop, a cooling water system, an electric heating system and a bubble monitoring system;

the six-degree-of-freedom motion simulation platform is composed of a mechanical table body, a driving system and a control system;

the main circulation loop is composed of an S-shaped preheater 7, a three-surface visualization experimental section 4, a double-pipe condenser 14, a pressurizing circulating pump 8, a voltage stabilizer 9, an electromagnetic flowmeter 10 and an exhaust valve 27, and the main circulation loop is fixed to the mechanical table body of the six-degree-of-freedom motion simulation platform through a truss structure; the three-surface visualization experimental section 4 is connected into an ascending section of the main circulation loop through pressure-bearing bodies 21 and an insulating flange, the S-shaped preheater 7, the ascending section of the main circulation loop, an inner pipe of the double-pipe condenser 14 and a descending section of the main circulation loop are sequentially connected in a welded mode, the pressurizing circulating pump 8 and the exhaust valve 27 communicate with an outlet section of the inner pipe of the double-pipe condenser 14, the voltage stabilizer 9 communicates with an inlet section of the S-shaped preheater 7, and the electromagnetic flowmeter 10 is mounted at the inlet section of the S-shaped preheater 7;

the cooling water system is composed of the double-pipe condenser 14, a plate heat exchanger 18, a cooling tower 17, a cooling fan 16, a cooling water tank 30, a circulating pump 15 and an electromagnetic flowmeter; the primary side of the plate heat exchanger 18 is connected with an outer pipe of the double-pipe condenser 14 through a stainless steel hose to form an indoor part of the cooling water system; the secondary side of the plate heat exchanger 18 is connected with the cooling water tank 30 and the cooling tower 17 to form an outdoor part of the cooling water system, and the cooling fan 16 is mounted in the cooling tower 17; the indoor part and the outdoor part of the cooling water system are respectively provided with the electromagnetic flowmeter and the circulating pump 15;

the electric heating system is composed of a direct-current power supply 5 and a controllable power transformer 6, the direct-current power supply 5 is fixed to a mechanical platform and heats a rectangular flow channel 22 through electric heating rods 26 embedded in the pressure-bearing bodies 21 of the three-surface visualization experimental section 4, and the controllable power transformer 6 is connected with the S-shaped preheater 7 and outputs constant power to the S-shaped preheater 7;

the three-surface visualization experimental section 4 is composed of the pressure-bearing bodies 21, the rectangular flow channel 22, front windows 23, a transparent material 24, side windows 20 and the heating rods 26; the upper and lower pressure-bearing bodies 21 and the transparent material 24 in the upper and lower pressure bearing bodies 21 are fastened and connected through flanges; the rectangular flow channel 22 is defined by a rectangular groove of the transparent material 24 and the pressure-bearing bodies 21; the front windows 23 and the side windows 20 are respectively formed in the front surfaces and the side surfaces of the pressure-bearing bodies 21; the heating rods 26 are embedded in the pressure-bearing bodies 21 and are electrified and heated by the direct-current power supply 5, so that the power control sensitivity is high; a plurality of thermocouples 19 are embedded in the pressure-bearing bodies 21 by clinging to the rectangular flow channel 22 along the flow direction to measure the wall temperature; and the bubble monitoring system is composed of two high-speed cameras 2, a particle image velocimetry (PIV) measuring system and an electric servo module, the high-speed cameras 2 and the PIV measuring system are respectively fixed to a truss of the mechanical table body, bubble generation and motion conditions in the rectangular flow channel 22 are monitored at the same time through the front windows 23 and the side windows 20 of the three-surface visualization experimental section 4 respectively, and the electric servo module is remotely controlled by a computer 1 to adjust the orientations of the cameras 2 and the PIV measuring system 1.

The mechanical table body of the six-degree-of-freedom motion simulation platform comprises an upper table top 12 and a lower base 13, the driving system comprises joint hinges 29 and six telescopic cylinders 28, the telescopic cylinders 28 are driven by a servo motor and are arranged in parallel, and the two ends of the telescopic cylinders 28 are connected with the upper table top 12 and the lower base 13 through the joint hinges 29 respectively; and six-degree-of-freedom motion of the upper table top 12 is achieved through telescopic motion of the six telescopic cylinders 28.

The PIV measuring system is composed of a laser generator 25 and a PIV special cross-frame CCD camera 3.

The high-speed cameras 2 and the PIV measuring system are used for monitoring bubble and flow field information from a wide surface and a narrow surface of the rectangular flow channel 22 at the same time, monitoring images are processed through the computer 1, and three-dimensional imaging of the bubbles is achieved.

The thermocouples 19 are embedded in the pressure-bearing bodies 21 at equal intervals every 100 mm along the flow direction by clinging to the rectangular flow channel 22 to measure the wall temperature.

According to an experimental method of the narrow slit channel visualization experimental device under a six-degree-of-freedom motion condition, water filling leakage detection and compression resistance experiments are carried out on the main circulation loop and the cooling water system before an experiment is started to ensure that the main circulation loop is leakage-free in a large-flow and high-pressure state;

before the experiment is started, the pressurizing circulating pump 8 and the exhaust valve 27 are started, gas in the main circulation loop is exhausted, all working media in the main circulating loop are kept to be single-phase water, and then tracer particles are injected; then, the exhaust valve 27 is closed, and the voltage stabilizer 9 is adjusted, so that the pressure of the main circulation loop is working condition pressure of an experimental target;

when the bubble monitoring system is started, the electric servo module is remotely controlled by the computer 1, and the two high-speed cameras 2 and the PIV measuring system are corrected according to set reference orientations;

when the cooling water system is started, valves of the indoor part and the outdoor part are kept in an open state, circulating pumps of the indoor part and the outdoor part are started respectively, and the cooling fan 16 is started to accelerate cooling of a fluid in the cooling tower 17;

when the electric heating system is started, the heating power of the three-surface visualization experimental section 4 and the S-shaped preheater 7 is gradually and slowly increased, it is guaranteed that the wall temperature rise amplitude of the three-surface visualization experimental section does not exceed 15 DEG C every time the power is increased, and after the wall temperature of the three-surface visualization experimental section 4 and the flow of the main circulation loop are stable, next power rise operation is carried out until the inlet fluid temperature of the three-surface visualization experimental section 4 reaches working condition temperature of the experimental target; and when the six-degree-of-freedom motion simulation platform is started, it is guaranteed that the reference of each telescopic cylinder is corrected, a power supply of the driving system is started, the mechanical table body is raised to a certain height through the control system, enough space allowance is reserved for subsequent simulation of various motions, and a motion working condition of the experimental target is set for motion simulation.

Compared with the prior art, the present disclosure has the following advantages:

Firstly, according to experimental system and the experimental method, bubble dynamic characteristic experimental research under the six-degree-of-freedom motion condition is achieved, inclination along any direction, translation along x, y and z axes and oscillating motion around the x, y and z axes can be achieved through telescopic motion of the six telescopic cylinders, various coupling motions of the motion can be achieved, and complex ocean motion conditions are accurately simulated.

Secondly, three-surface visualization of the experimental section is achieved, bubble and flow field information is monitored from the wide surface and the narrow surface of the narrow slit flow channel at the same time by means of the high-speed cameras and the PIV system, monitoring images are processed through the computer, and three-dimensional imaging of bubbles is achieved.

Thirdly, bubble dynamic characteristic experimental research under the six-degree-of-freedom motion condition and under two flow modes of natural circulation and forced circulation can be achieved.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

A detailed description of the present disclosure is further described in conjunction with the following attached figures and embodiments.

Figure 1:
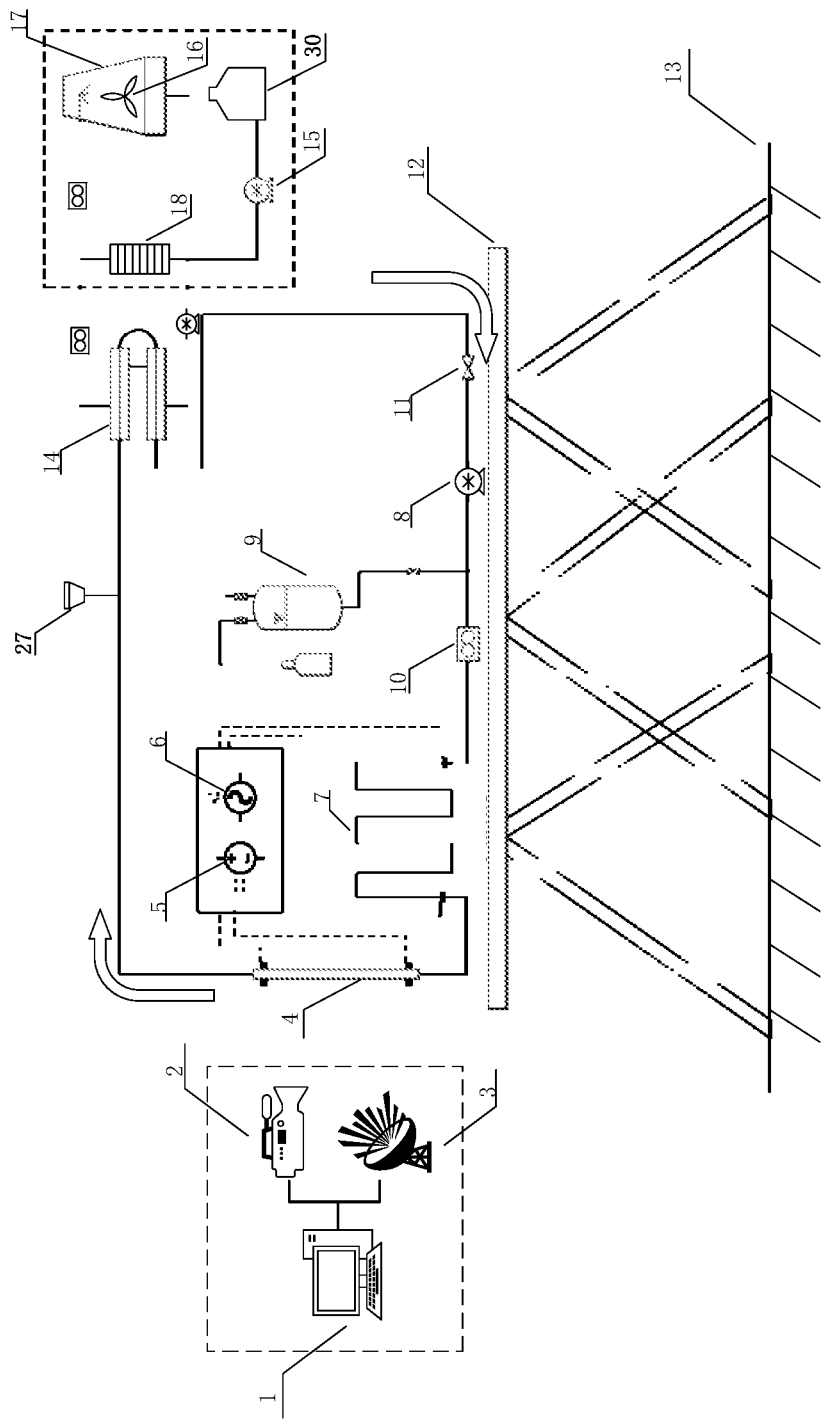
FIG. 1 is a systematic schematic diagram of an experimental system.

As shown in FIG. 1, the present disclosure relates to a narrow slit channel visualization experimental device under a six-degree-of-freedom motion condition comprising a six-degree-of-freedom motion simulation platform, a main circulation loop, a cooling water system, an electric heating system and a bubble monitoring system; the six-degree-of-freedom motion simulation platform is composed of a mechanical table body, a driving system and a control system; the main circulation loop is composed of an S-shaped preheater 7, a three-surface visualization experimental section 4, a double-pipe condenser 14, a pressurizing circulating pump 15, a voltage stabilizer 9, an electromagnetic flowmeter 10 and an exhaust valve 27, and is fixed to the mechanical table body of the six-degree-of-freedom motion simulation platform through a truss structure; the three-surface visualization experimental section 4 is connected into an ascending section of the main circulation loop through aluminum pressure-bearing bodies 21 and an insulating flange, the S-shaped preheater 7, the ascending section (an upward arrow in the figure) of the main circulation loop, an inner pipe of the double-pipe condenser 14 and a descending section (a downward arrow in the figure) of the main circulation loop are sequentially connected in a welded mode, the pressurizing circulating pump 8 and the exhaust valve 27 communicate with an outlet section of the inner pipe of the double-pipe condenser 14, the voltage stabilizer 9 communicates with an inlet section of the S-shaped preheater 7, and the electromagnetic flowmeter 10 is mounted at the inlet section of the S-shaped preheater 7; the cooling water system is composed of the double-pipe condenser 14, a plate heat exchanger 18, a cooling tower 17, a cooling fan 16, a cooling water tank 30, a circulating pump 15 and an electromagnetic flowmeter; the primary side of the plate heat exchanger 18 is connected with an outer pipe of the double-pipe condenser 14 through a stainless steel hose to form an indoor part of the cooling water system; the secondary side of the plate heat exchanger 18 is connected with the cooling water tank 30 and the cooling tower 17 to form an outdoor part of the cooling water system, and the cooling fan 16 is mounted in the cooling tower 17; the indoor part and the outdoor part of the cooling water system are respectively provided with the electromagnetic flowmeter and the circulating pump 15; and the electric heating system is composed of a direct-current power supply 5 and a controllable power transformer 6, the direct-current power supply 5 is fixed to a mechanical platform and heats a rectangular flow channel 22 through electric heating rods 26 embedded in the pressure-bearing bodies 21 of the three-surface visualization experimental section 4, and the transformer 6 is connected with the S-shaped preheater 7 and outputs constant power to the S-shaped preheater 7.

Figure 3:
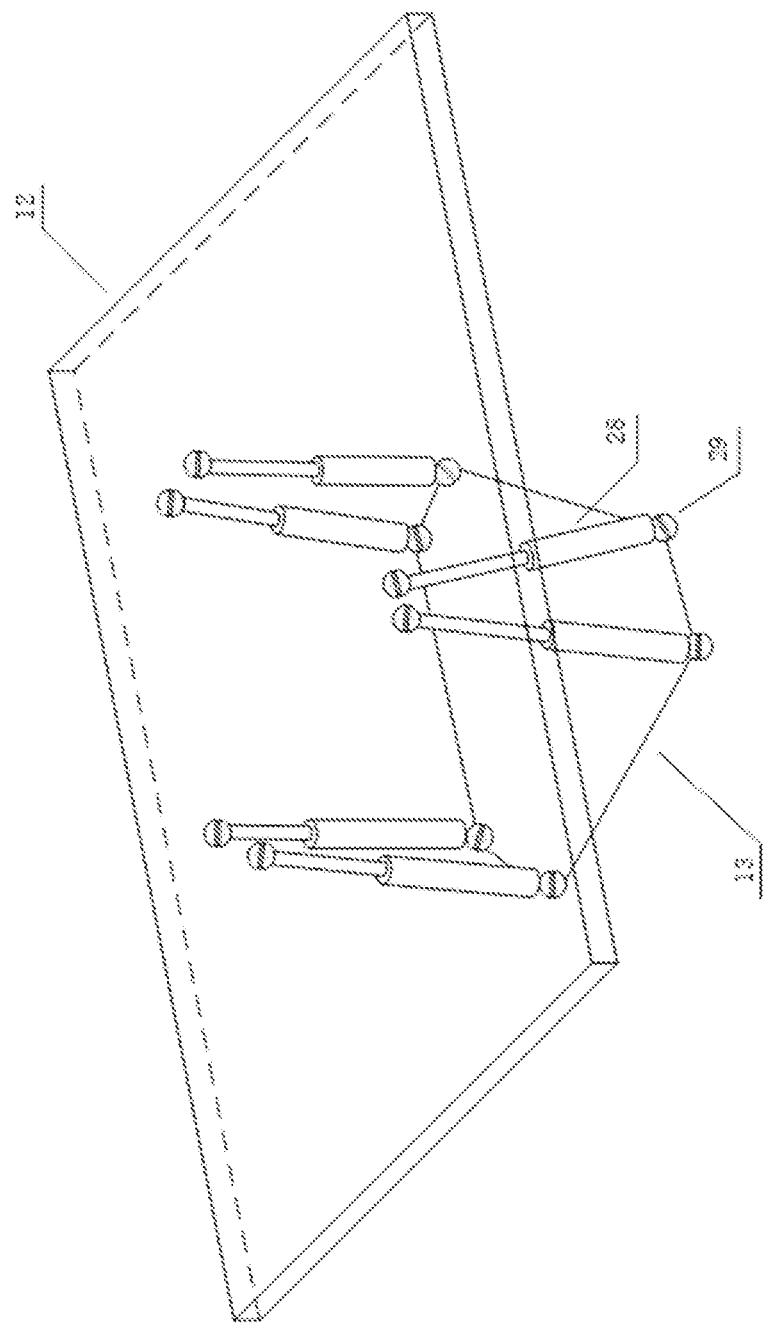
FIG. 3 is a schematic diagram of a motion simulation platform of the experimental system.

As shown in FIG. 3, the mechanical table body of the six-degree-of-freedom motion simulation platform comprises an upper table top 12 and a lower base 13, the driving system comprises joint hinges 29 and six telescopic cylinders 28, the telescopic cylinders 28 are driven by a servo motor and are arranged in parallel, and the two ends of the telescopic cylinders 28 are connected with the upper table top 12 and the lower base 13 through the joint hinges 29 respectively; and six-degree-of-freedom motion of the upper table top 12 is achieved through telescopic motion of the six telescopic cylinders 28.

Figure 2:
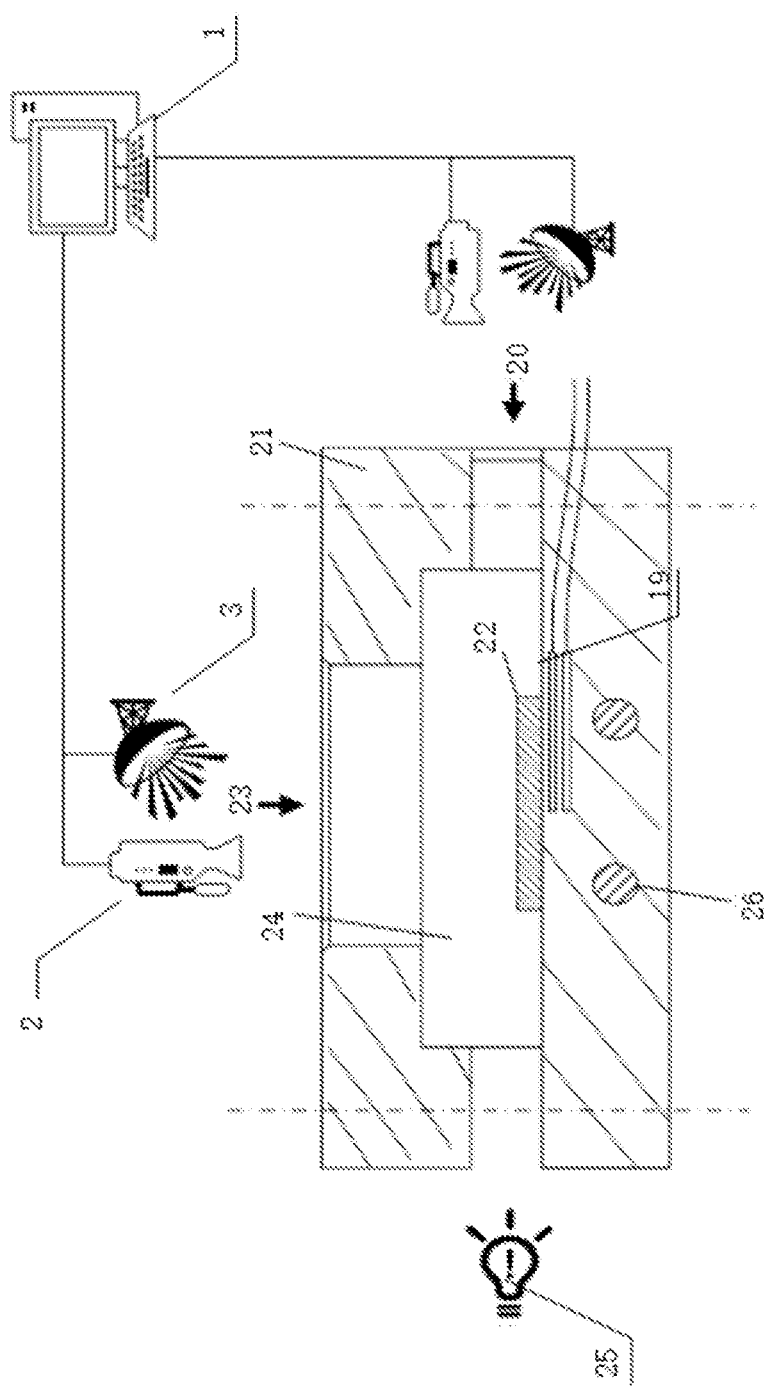
FIG. 2 is a schematic diagram of a three-surface visualization experimental section of the experimental system.

As shown in FIG. 2, the three-surface visualization experimental section 4 is composed of the pressure-bearing bodies 21, the rectangular flow channel 22, front windows 23, a transparent material 24, side windows 20 and the heating rods 26; the upper and lower pressure-bearing bodies 21 and the transparent material 24 in the upper and lower pressure bearing bodies 21 are fastened and connected through flanges; the rectangular flow channel 22 is defined by a rectangular groove of the transparent material 24 and the pressure-bearing bodies 21; the front windows 23 and the side windows 20 are respectively formed in the front surfaces and the side surfaces of the pressure-bearing bodies 21; the heating rods 26 are embedded in the pressure-bearing bodies 21 and are electrified and heated by the direct-current power supply 5, so that the power control sensitivity is high; a plurality of thermocouples 19 are embedded in the pressure-bearing bodies 21 by clinging to the rectangular flow channel 22 along the flow direction to measure the wall temperature; and an impulse pipe of the experimental section is provided with the insulating flange, so that temperature error caused by a two-point heating mode can be avoided. The bubble monitoring system is composed of two high-speed cameras 2, a PIV measuring system and an electric servo module, the high-speed cameras 2 and the PIV measuring system are respectively fixed to a truss of the mechanical table body, bubble generation and motion conditions in the rectangular flow channel 22 are monitored at the same time through the front windows 23 and the side windows 20 of the three-surface visualization experimental section 4 respectively, and the PIV system is composed of a laser generator 25 and a PIV special cross-frame CCD camera 3. The electric servo module is remotely controlled by a computer 1 to adjust the orientations of the cameras 2 and the PIV measuring system 1. The high-speed cameras 2 and the PIV measuring system 3 are used for monitoring bubble and flow field information from a wide surface and a narrow surface of the rectangular flow channel 22 at the same time, monitoring images are processed through the computer 1, and three-dimensional imaging of the bubbles is achieved.

As shown in FIG. 1, according to an experimental scheme of the narrow slit channel visualization experimental device under a six-degree-of-freedom motion condition, water filling leakage detection and compression resistance experiments are carried out on each loop before an experiment is started to ensure that the loop is leakage-free in a large-flow and high-pressure state; before the experiment is started, the pressurizing circulating pump 15 and the exhaust valve 27 are started, gas in the main circulation loop is exhausted, all working media in the main circulating loop are kept to be single-phase water, and then tracer particles are injected; then, the exhaust valve 27 is closed, and the voltage stabilizer 9 is adjusted, so that the pressure of the main circulation loop is working condition pressure of an experimental target; when the bubble monitoring system is started, the electric servo module is remotely controlled by the computer 1, and the two high-speed cameras 2 and the PIV measuring system are corrected according to set reference orientations; when the cooling water system is started, valves of the indoor part and the outdoor part are kept in an open state, circulating pumps of the indoor part and the outdoor part are started respectively, and the cooling fan 16 is started to accelerate cooling of a fluid in the cooling tower 17; when the electric heating system is started, the heating power of the three-surface visualization experimental section 4 and the S-shaped preheater 7 is gradually and slowly increased, it is guaranteed that the wall temperature rise amplitude of the three-surface visualization experimental section does not exceed 15 degree Celsius every time the power is increased, and after the wall temperature of the three-surface visualization experimental section 4 and the flow of the main circulation loop are stable, next power rise operation is carried out until the inlet fluid temperature of the three-surface visualization experimental section 4 reaches working condition temperature of the experimental target; and when the six-degree-of-freedom motion simulation platform is started, it is guaranteed that the reference of each telescopic cylinder is corrected, a power supply of the driving system is started, the mechanical table body 12 is raised to a motion neutral position through the control system, and a motion working condition of the experimental target is set for motion simulation.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A device for narrow slit channel visualization experiment under a six-degree-of-freedom motion condition, the device comprising:
a six-degree-of-freedom motion simulation platform having a mechanical table body, a driving system and a control system;
a main circulation loop having an S-shaped preheater, a three-surface visualization experimental section, a double-pipe condenser, a pressurizing circulating pump, a voltage stabilizer, an electromagnetic flowmeter and an exhaust valve, the main circulation loop being fixed to the mechanical table body of the six-degree-of-freedom motion simulation platform through a truss structure, wherein the three-surface visualization experimental section is connected into an ascending section of the main circulation loop through pressure-bearing bodies and an insulating flange, wherein the S-shaped preheater, the ascending section of the main circulation loop, an inner pipe of the double-pipe condenser and a descending section of the main circulation loop is sequentially connected in a welded mode, the pressurizing circulating pump and the exhaust valve communicate with an outlet section of the inner pipe of the double-pipe condenser, wherein the voltage stabilizer communicates with an inlet section of the S-shaped preheater, and wherein the electromagnetic flowmeter is mounted at the inlet section of the S-shaped preheater;
a cooling water system including the double-pipe condenser, a plate heat exchanger, a cooling tower, a cooling fan, a cooling water tank, a circulating pump and an electromagnetic flowmeter, wherein a primary side of the plate heat exchanger is connected with an outer pipe of the double-pipe condenser through a stainless steel hose to form an indoor part of the cooling water system, wherein a secondary side of the plate heat exchanger is connected with the cooling water tank and the cooling tower to form an outdoor part of the cooling water system, wherein the cooling fan is mounted in the cooling tower, and wherein the indoor part and the outdoor part of the cooling water system are respectively provided with the electromagnetic flowmeter and the circulating pump;
an electric heating system having a direct-current power supply and a controllable power transformer, wherein the direct-current power supply is fixed to a mechanical platform and heats a rectangular flow channel through electric heating rods embedded in the pressure-bearing bodies of the three-surface visualization experimental section, wherein the controllable power transformer is connected with the S-shaped preheater and outputs constant power to the S-shaped preheater, wherein the three-surface visualization experimental section is composed of the pressure-bearing bodies, the rectangular flow channel, front windows, a transparent material, side windows and the heating rods, wherein the upper and lower pressure-bearing bodies and the transparent material in the upper and lower pressure bearing bodies are fastened and connected through flanges, wherein the rectangular flow channel is defined by a rectangular groove of the transparent material and the pressure-bearing bodies, wherein the front windows and the side windows are respectively formed in the front surfaces and the side surfaces of the pressure-bearing bodies, wherein the heating rods are embedded in the pressure-bearing bodies and are electrified and heated by the direct-current power supply, so that the power control sensitivity is high, wherein a plurality of thermocouples are embedded in the pressure-bearing bodies by clinging to the rectangular flow channel along the flow direction for measuring wall temperatures; and a bubble monitoring system having two high-speed cameras, a particle image velocimetry measuring system and an electric servo module, wherein the high-speed cameras and the particle image velocimetry measuring system are respectively fixed to a truss of the mechanical table body, wherein bubble generation and motion conditions in the rectangular flow channel are monitored at the same time through the front windows and the side windows of the three-surface visualization experimental section, respectively, and wherein the electric servo module is remotely controlled by a computer to adjust the orientations of the cameras and the particle image velocimetry measuring system.

2. The device of claim 1, wherein the mechanical table body of the six-degree-of-freedom motion simulation platform comprises an upper table top and a lower base, wherein the driving system comprises joint hinges and six telescopic cylinders, wherein the telescopic cylinders are driven by a servo motor and are arranged in parallel, and wherein the two ends of the telescopic cylinders are connected with the upper table top and the lower base through the joint hinges, respectively, and wherein the six-degree-of-freedom motion of the upper table top is achieved through telescopic motion of the six telescopic cylinders.

3. The device of claim 1, wherein the particle image velocimetry measuring system is composed of a laser generator and a particle image velocimetry special cross-frame CCD camera.

4. The device of claim 1, wherein the high-speed cameras and the particle image velocimetry measuring system are used for monitoring bubble and flow field information from a wide surface and a narrow surface of the rectangular flow channel at the same time, monitoring images are processed through the computer, and three-dimensional imaging of the bubbles is achieved.

5. The device of claim 1, wherein the thermocouples are embedded in the pressure-bearing bodies at equal intervals of every 100 mm along the flow direction by clinging to the rectangular flow channel for the wall temperature measurement.

6. An experimental method of the narrow slit channel visualization experimental device under a six-degree-of-freedom motion condition according to claim 1, wherein water filling leakage detection and compression resistance experiments are carried out on the main circulation loop and the cooling water system before an experiment is started to ensure that the main circulation loop is leakage-free in a large-flow and high-pressure state;

before the experiment is started, the pressurizing circulating pump and the exhaust valve are started, gas in the main circulation loop is exhausted, all working media in the main circulating loop are kept to be single-phase water, and then tracer particles are injected; then, the exhaust valve is closed, and the voltage stabilizer is adjusted, so that the pressure of the main circulation loop is working condition pressure of an experimental target;

when the bubble monitoring system is started, the electric servo module is remotely controlled by the computer, and the two high-speed cameras and the particle image velocimetry measuring system are corrected according to set reference orientations;

when the cooling water system is started, valves of the indoor part and the outdoor part are kept in an open state, circulating pumps of the indoor part and the outdoor part are started respectively, and the cooling fan is started to accelerate cooling of a fluid in the cooling tower;

when the electric heating system is started, the heating power of the three-surface visualization experimental section and the S-shaped preheater is gradually and slowly increased, wherein a rise amplitude of the wall temperature of the three-surface visualization experimental section does not exceed 15 DEG C every time the heating power is increased, and after the wall temperature of the three-surface visualization experimental section and the flow of the main circulation loop are stable, next power rise operation is carried out until the inlet fluid temperature of the three-surface visualization experimental section reaches working condition temperature of the experimental target; and when the six-degree-of-freedom motion simulation platform is started, the reference of each telescopic cylinder is corrected, a power supply of the driving system is started, the mechanical table body is raised to a certain height through the control system, enough space allowance is reserved for subsequent simulation of various motions, and a motion working condition of the experimental target is set for motion simulation.

7. The experimental method of the narrow slit channel visualization experimental device under a six-degree-of-freedom motion condition according to claim 6, wherein the mechanical table body of the six-degree-of-freedom motion simulation platform comprises an upper table top and a lower base, wherein the driving system comprises joint hinges and six telescopic cylinders, wherein the telescopic cylinders are driven by a servo motor and are arranged in parallel, wherein the two ends of the telescopic cylinders are connected with the upper table top and the lower base through the joint hinges, respectively, and wherein a six-degree-of-freedom motion of the upper table top is achieved through telescopic motion of the six telescopic cylinders.

8. The experimental method of the narrow slit channel visualization experimental device under a six-degree-of-freedom motion condition according to claim 6, wherein the particle image velocimetry measuring system is composed of a laser generator and a particle image velocimetry special cross-frame CCD camera.

9. The experimental method of the narrow slit channel visualization experimental device under a six-degree-of-freedom motion condition according to claim 6, wherein the highspeed cameras and the particle image velocimetry measuring system are used for monitoring bubble and flow field information from a wide surface and a narrow surface of the rectangular flow channel at the same time, wherein monitoring images are processed through the computer, and wherein three-dimensional imaging of the bubbles is achieved.

10. The experimental method of the narrow slit channel visualization experimental device under a six-degree-of-freedom motion condition according to claim 6, wherein the thermocouples are embedded in the pressure-bearing bodies at equal intervals every 100 mm along the flow direction by clinging to the rectangular flow channel to measure the wall temperature.

* * * * *